United States Patent
Friesen et al.

(10) Patent No.: US 8,168,337 B2
(45) Date of Patent: May 1, 2012

(54) ELECTROCHEMICAL CELL, AND PARTICULARLY A METAL FUELED CELL WITH NON-PARALLEL FLOW

(75) Inventors: Cody A. Friesen, Mesa, AZ (US); Joel R. Hayes, Chandler, AZ (US)

(73) Assignee: Arizona Board of Regents for and on Behalf of Arizona State University, Tempe, AZ (US)

( * ) Notice: Subject to any disclaimer, the term of this patent is extended or adjusted under 35 U.S.C. 154(b) by 336 days.

(21) Appl. No.: 12/385,217

(22) Filed: Apr. 1, 2009

(65) Prior Publication Data
US 2011/0039181 A1    Feb. 17, 2011

Related U.S. Application Data

(60) Provisional application No. 61/064,955, filed on Apr. 4, 2008.

(51) Int. Cl.
*H01M 8/08* (2006.01)
*H01M 8/22* (2006.01)

(52) U.S. Cl. ........ 429/402; 429/405; 429/452; 429/501; 429/503

(58) Field of Classification Search .......... 429/402–407, 429/452, 463, 498–503
See application file for complete search history.

(56) References Cited

U.S. PATENT DOCUMENTS

| | | |
|---|---|---|
| 3,650,837 A | 3/1972 | Palmer |
| 3,801,376 A | 4/1974 | Lindstrom |
| 4,119,772 A | 10/1978 | Peters et al. |
| 4,317,863 A | 3/1982 | Struthers |
| 4,871,627 A | 10/1989 | Strong |
| 5,104,497 A | 4/1992 | Tetzlaff |
| 5,190,833 A | 3/1993 | Goldstein et al. |
| 5,376,471 A | 12/1994 | Hunter et al. |
| 5,415,949 A | 5/1995 | Stone et al. |
| 5,434,020 A | 7/1995 | Cooper |
| 5,439,758 A | 8/1995 | Stone et al. |
| 5,458,988 A | 10/1995 | Putt |
| 5,567,540 A | 10/1996 | Stone et al. |
| 5,652,068 A | 7/1997 | Shuster et al. |
| 5,972,531 A | 10/1999 | Kawakami |
| 6,057,052 A | 5/2000 | Shrim et al. |

(Continued)

OTHER PUBLICATIONS

Kjeang et al., "A Microfluidic Fuel Cell with Flow-Through Porous Electrodes". Journal of American Chemical Society. Mar. 4, 2008, vol. 130, pp. 4000-4006.*

(Continued)

*Primary Examiner* — Basia Ridley
*Assistant Examiner* — Jacob Buchanan
(74) *Attorney, Agent, or Firm* — Pillsbury Winthrop Shaw Pittman LLP (57) ABSTRACT

The present invention relates to an electrochemical cell for use with an electrolyte, oxidizable solid fuel, and an oxidizer to generate electrical power. The electrochemical cell includes a permeable electrode body provided along a flow path for receiving a flow including an electrolyte. The permeable electrode body is configured to permit the electrolyte to flow therethrough and to collect solid fuel thereon from the electrolyte flowing therethrough so as to comprise a first electrode for oxidizing the fuel to generate electrons for conduction by the first electrode. The cell also includes a second electrode for receiving electrons and reducing an oxidizer. The first electrode and the second electrode are spaced apart to define a gap therebetween for receiving the flow from the permeable electrode body. One or more return channels are directly communicated to the gap.

52 Claims, 8 Drawing Sheets

U.S. PATENT DOCUMENTS

| | | | |
|---|---|---|---|
| 6,355,369 B1 | 3/2002 | Iarochenko et al. | |
| 6,383,673 B1 | 5/2002 | Faris et al. | |
| 6,410,174 B1 | 6/2002 | Faris | |
| 6,458,480 B1 | 10/2002 | Morris et al. | |
| 6,472,093 B2 | 10/2002 | Faris et al. | |
| 6,544,678 B2 | 4/2003 | Faris et al. | |
| 6,558,830 B2 | 5/2003 | Faris et al. | |
| 6,562,504 B2 | 5/2003 | Faris et al. | |
| 6,566,000 B1 | 5/2003 | Iarochenko et al. | |
| 6,569,555 B1 | 5/2003 | Faris et al. | |
| 6,641,943 B1 | 11/2003 | Faris et al. | |
| 6,649,294 B2 | 11/2003 | Faris et al. | |
| 6,713,206 B2 | 3/2004 | Markoski et al. | |
| 6,787,260 B2 | 9/2004 | Smedley | |
| 6,911,274 B1 | 6/2005 | Colborn et al. | |
| 6,942,105 B2 | 9/2005 | Smedley et al. | |
| 6,986,964 B2 | 1/2006 | Faris | |
| 7,226,676 B2 | 6/2007 | Faris et al. | |
| 7,252,898 B2 | 8/2007 | Markoski et al. | |
| 7,276,309 B2 | 10/2007 | Smedley et al. | |
| 7,291,186 B2 | 11/2007 | Zhang et al. | |
| 2001/0007725 A1 | 7/2001 | Faris et al. | |
| 2002/0045075 A1 | 4/2002 | Pinto et al. | |
| 2003/0054217 A1 | 3/2003 | Faris | |
| 2003/0143446 A1 | 7/2003 | Faris et al. | |
| 2003/0165727 A1 | 9/2003 | Priestnall et al. | |
| 2003/0198862 A1 | 10/2003 | Struthers | |
| 2004/0005488 A1 | 1/2004 | Faris et al. | |
| 2004/0023112 A1 | 2/2004 | Lin | |
| 2004/0053132 A1 | 3/2004 | Smedley et al. | |
| 2004/0058203 A1 | 3/2004 | Priestnall et al. | |
| 2004/0126642 A1* | 7/2004 | Smedley et al. | 429/34 |
| 2004/0146764 A1 | 7/2004 | Tsai et al. | |
| 2004/0157101 A1* | 8/2004 | Smedley | 429/30 |
| 2004/0180246 A1 | 9/2004 | Smedley | |
| 2004/0229107 A1 | 11/2004 | Smedley | |
| 2004/0247969 A1 | 12/2004 | Faris et al. | |
| 2005/0019634 A1 | 1/2005 | Legg | |
| 2006/0003217 A1 | 1/2006 | Cohen et al. | |
| 2007/0077491 A1 | 4/2007 | Burchardt | |
| 2007/0092787 A1 | 4/2007 | Wang Chen | |
| 2007/0154766 A1 | 7/2007 | Baik et al. | |
| 2007/0224500 A1 | 9/2007 | White et al. | |
| 2007/0259234 A1 | 11/2007 | Chua et al. | |
| 2007/0264550 A1 | 11/2007 | Zhang et al. | |
| 2009/0092882 A1* | 4/2009 | Kjeang et al. | 429/34 |

OTHER PUBLICATIONS

Kamil S. Salloum et al., Sequential flow membraneless microfluidic fuel cell with porous electrodes, Journal of Power Sources 180, 2008, pp. 243-252.

International Search Report for PCT/US2009/039460, mailed on May 26, 2009.

Written Opinion of the International Searching Authority for PCT/US2009/039460, mailed on May 26, 2009.

Intl. Preliminary Report on Patentability dated Apr. 29, 2011 of PCT/US09/39460 filed Apr. 3, 2009 (21 pages).

* cited by examiner

ELECTROCHEMICAL CELL, AND PARTICULARLY A METAL FUELED CELL WITH NON-PARALLEL FLOW

CROSS-REFERENCE TO RELATED APPLICATIONS

The present application claims the benefit of priority from U.S. Provisional Patent Application No. 61/064,955, filed on Apr. 4, 2008, the entire content of which is incorporated herein by reference.

FIELD

The present application relates to an electrochemical cell for generating power, and more particularly a metal-air fuel cell.

BACKGROUND

If fuel cells are to become viable portable power sources in the future, solutions to a number of difficult, persistent technical problems are needed. Many of these problems are associated with the presence of the proton exchange membrane, which is highly sensitive to various factors, such as operating temperature and membrane humidity. Efforts in portable applications have largely focused on reducing the size of proton exchange membrane (PEM) fuel cells. By portable power sources, this is generally referring to substitutes for batteries that power portable electronic devices. This approach carries all the cost and efficiency issues associated with larger scale PEM fuel cells. Moreover, the reduction in size exacerbates some of these problems, and introduces even further problems that require resolution for a commercially viable product.

One approach has been to deliver laminar flows of oxidizer and fuel saturated electrolytes into a single channel with a cathode on one side and an anode on another. See, e.g., Membraneless Vanadium Redox Fuel Cell Using Laminar Flow, Ferrigno et al., J. Amer. Chem. Soc. 2002, 124, 12930-12931; Fabrication and Preliminary Testing of a Planar Membraneless Microchannel Fuel Cell, Cohen et al., J. Power Sources, 139, 96-105; and Air-Breathing Laminar Flow-Based Microfluidic Fuel Cell, Jayashree et al., J. Am. Chem. Soc., 2005, 127, 16758-16759. See also, U.S. Pat. Nos. 7,252,898 and 6,713,206. Each of these is incorporated into the present application by reference in their entirety for background teachings.

This approach has various shortcomings. First, the fuel and oxidizer will mix downstream of the entry point, wasting significant amounts of the fuel. This is inefficient. Second, the diffusivity of many oxidizers leads to mixed potentials at the anode due to oxidizer crossover to the anode. This leads to inefficiency of the overall cell. Third, the architecture of the cell is restricted to the geometries, lengthscales, and electrolytes where laminar flow is ensured.

U.S. Patent Publication Nos. 2003/0165727 and 2004/0058203 disclose mixed reactant fuel cells where the fuel, oxidant and electrolyte are mixed together and then flow through the anode and cathode. These publications are incorporated herein by reference. According to these publications, the anode is allegedly selective for fuel oxidation and the cathode is allegedly selective for oxidizer reduction. The designs in these publications have significant shortcomings. First, the amount of some oxidizers that can be typically carried by an electrolyte is relatively low (e.g., the oxygen solubility in an electrolyte is typically quite low relative to fuel solubility). This means that a relatively high flow rate is required for the mixed reactants to ensure that an ample amount of oxidizer is flowing through the cell. That is, a relatively high flow rate is required to maximize oxidizer exposure and reaction at the cathode. But increasing the flow rate requires increased work, thus detracting from the overall power efficiency of the cell. Moreover, electrodes that are selective by virtue of their material properties tend to have lower reaction activity rates than non-selective electrodes. Because the designs in these two publications rely primarily on the use of selective electrodes for both the cathode and anode, this further detracts from the efficiency of the cell.

Fuel cells using metal particulates as the fuel are known. Examples of such devices are shown, for example, in U.S. Pat. Nos. 7,276,309; 6,942,105; 6,911,274 and 6,787,260, which are incorporated herein in their entirety. A short list of disadvantages of these previous embodiments includes: the buildup of precipitated reaction products in the anode space and the cathode space, issues related to the feed of the solid particle fuel, and the sluggish rate of net oxidation of the fuel due to the increased concentration of oxidized fuel in the vicinity of the as yet unoxidized fuel.

The present application endeavors to meet the long-felt and unresolved need for an electrochemical cell technology that eliminates the use of a proton exchange membrane, yet operates efficiently and effectively. An example of a membraneless fuel cell is provided in U.S. patent application Ser. No. 11/962,803, filed Dec. 21, 2007, the entire content of which is incorporated herein by reference.

SUMMARY

According to an aspect of the present invention, there is provided an electrochemical cell for use with an electrolyte, oxidizable solid fuel, and an oxidizer to generate electrical power. The electrochemical cell includes a permeable electrode body provided along a flow path for receiving a flow comprising at least the electrolyte. The permeable electrode body is configured to permit the electrolyte to flow therethrough. The permeable electrode body is also configured to collect the solid fuel thereon when the solid fuel is present in the electrolyte flowing therethrough so as to comprise a first electrode for oxidizing the fuel to generate electrons for conduction by the first electrode. The electrochemical cell also includes a second electrode for receiving electrons and reducing an oxidizer. The first electrode and the second electrode are spaced apart to define a gap therebetween for receiving the flow from the permeable electrode body. The electrochemical cell also includes one or more return channels communicated to the gap, and a flow generator configured to generate the flow comprising at least the electrolyte (i) through the permeable electrode body and towards the second electrode across the gap to transport at least the electrolyte and the oxidized fuel ions away from the permeable electrode body and towards the second electrode, and (ii) then through the one or more return channels to transport at least the electrolyte and any by-product formed.

According to an aspect of the present invention, there is provided an electrochemical cell system that includes an electrolyte, oxidizable solid fuel, and a plurality of electrochemical cells arranged in an array. Each electrochemical cell includes (i) a permeable electrode body provided along a flow path for receiving a flow comprising at least the electrolyte, the permeable electrode body being configured to permit the electrolyte to flow therethrough, the permeable electrode body also being configured to collect the solid fuel thereon when the solid fuel is present in the electrolyte flowing therethrough so as to comprise a first electrode for oxidizing the fuel to generate electrons for conduction by the first electrode; (ii) a second electrode for receiving electrons and reducing an oxidizer; (iii) the first electrode and the second electrode being spaced apart to define a gap therebetween for receiving the flow from the permeable electrode body; and (iv) one or more return channels communicated to the gap. The electrochemical cell system also includes one or more flow generators configured to generate the flow in each electrochemical cell comprising at least the electrolyte (i) through the permeable electrode body and towards the second electrode across the gap to transport at least the electrolyte and the oxidized fuel ions away from the permeable electrode body and towards the second electrode, and (ii) then through the one or more return channels to transport at least the electrolyte and any by-product formed by the reaction of the oxidized fuel ions and the reduced oxidizer ions away from the gap.

According to an aspect of the present invention, there is provided a method for generating electrical current using an electrochemical cell. The method includes flowing an electrolyte and oxidizable solid fuel through a permeable electrode body provided along a flow path, the permeable electrode body permitting the electrolyte to flow therethrough and collecting the solid fuel thereon from the electrolyte so as to comprise a first electrode, the first electrode being spaced apart from a second electrode to define a gap therebetween. The method also includes oxidizing the oxidizable solid fuel at the first electrode and reducing an oxidizer at the second electrode whereby electrons are generated for conduction from the first electrode to the second electrode via a load, and the oxidized fuel ions and reduced oxidizer ions react to form a by-product. The method also includes flowing the electrolyte (i) through the permeable electrode body and towards the second electrode across the gap to transport at least the electrolyte and the oxidized fuel ions away from the permeable electrode body and towards the second electrode, and (ii) then through the one or more return channels to transport at least the electrolyte and the by-product formed by the reaction of the oxidized fuel ions and the reduced oxidizer ions away from the gap.

According to an aspect of the present invention, there is provided an electrochemical cell for use with an electrolyte and reactants comprising a fuel and an oxidizer. The electrochemical cell includes electrodes comprising: (i) an anode for oxidizing the fuel into at least oxidized fuel ions and electrons, and (ii) a cathode for accepting electrons and reducing the oxidizer into at least reduced oxidizer ions. A first of the electrodes is provided along a flow path for receiving a flow comprising the electrolyte and a corresponding first of the reactants, a second electrode for receiving a corresponding second of the reactants. The first and second electrodes are spaced apart to define a gap therebetween for receiving the flow from the first electrode. The electrochemical cell also includes one or more return channels communicated to the gap and disposed adjacent the first electrode and opposite the second electrode, and a flow generator configured to generate a flow comprising at least the electrolyte (i) from the first electrode and towards the second electrode across the gap to transport at least the electrolyte and the ions formed from oxidation or reduction of the first reactant at the first electrode away from the first electrode and towards the second electrode, and (ii) then through the one or more return channels to transport at least the electrolyte and any by-product formed by the reaction of the oxidized fuel ions and the reduced oxidizer ions away from the gap.

Other aspects of the present invention will become apparent from the following detailed description, the accompanying drawings, and the appended claims.

DETAILED DESCRIPTION

The Figures illustrate embodiments of various aspects of the inventions claimed. These embodiments are in no way intended to be limiting, and are intended only as an example for facilitating an understanding of the principles of the claimed inventions.

FIGS. 1-4 illustrate an electrochemical cell system, generally indicated at 1, according to embodiments of the present invention. As illustrated and described below, the electrochemical cell system 1 includes a plurality of electrochemical cells 10, and two of the electrochemical cells 10 are more clearly shown in cross-section in FIG. 4. Although a total of four electrochemical cells are illustrated in this embodiment, more or less electrochemical cells may be included in the system. Indeed, in certain applications, a large two-dimensional array of parallel electrochemical cells can be created to provide for increased power output. The illustrated embodiment is not intended to be limiting in any way.

Figure 1:
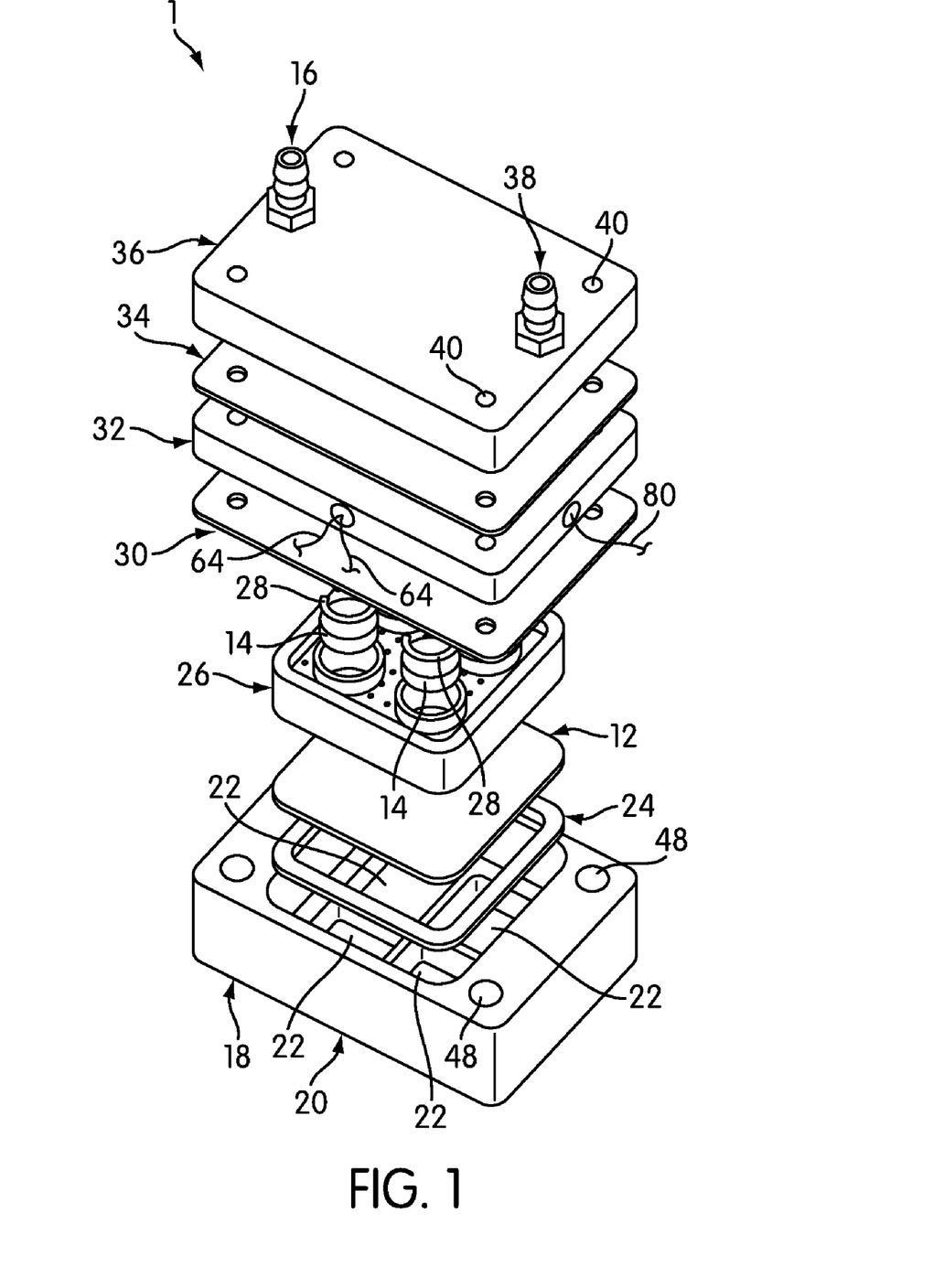
FIG. 1 is an exploded, perspective view of an embodiment of an electrochemical cell system that includes four electrochemical cells.
Figure 2:
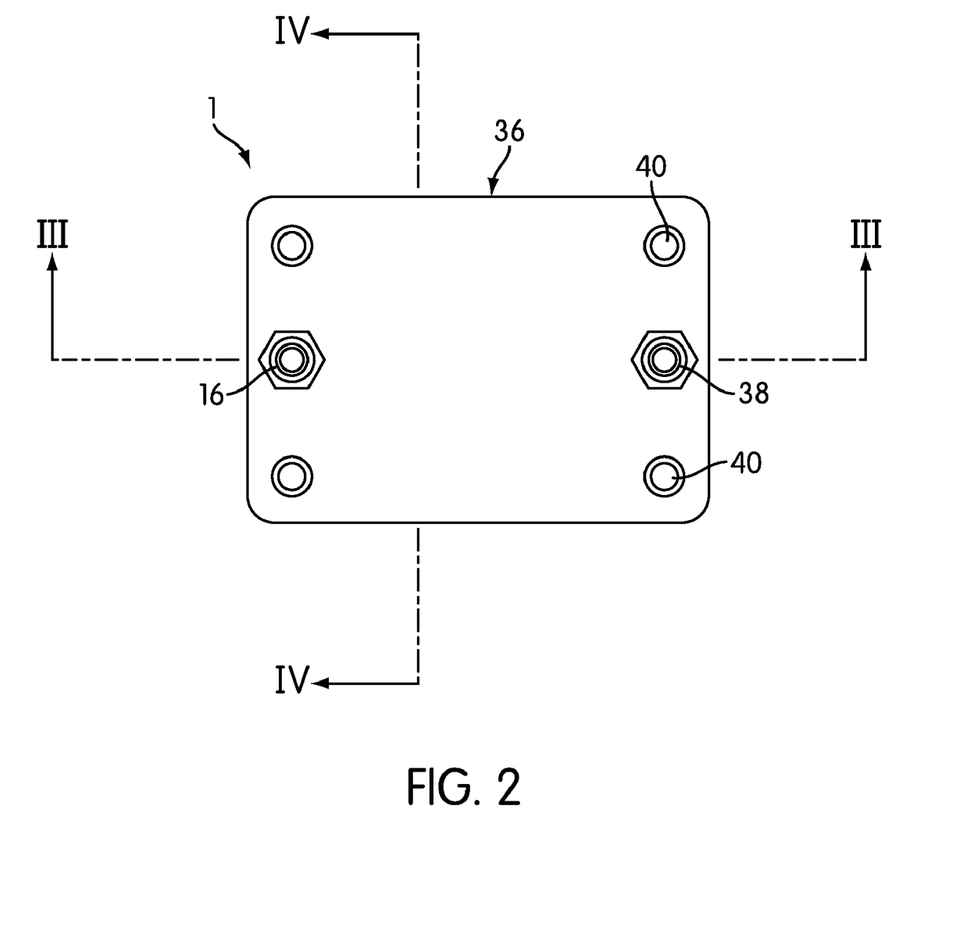
FIG. 2 is a top view of the electrochemical cell system of FIG. 1.

As discussed in further detail below, each electrochemical cell 10 has a cathode 12, and an anode 14 (two anodes are shown in FIG. 1, each representing one of the electrochemical cells 10). As used herein, the anode 14 is where the fuel of the system is oxidized; as discussed in further detail below, the anode 14 is comprised of the fuel in the form of solid fuel particles captured on a filter, but may be generally referred to as the anode, even when no fuel is present. The electrochemical cell system 1 also includes a fuel and electrolyte inlet 16 that may be connected to a fuel and electrolyte source (not shown), and an oxidizer input 18, which allows an oxidizer to enter the system.

The electrochemical cell system 1 includes a lower base 20 that is configured to support the components of the electrochemical cell system 1 described herein. For descriptive purposes, the electrochemical cell system 1 is illustrated and described as having an orientation in which the lower base 20 is located at the "bottom" of the system 1, but it should be understood that the system 1 may be oriented in any way. Thus, any directional references are made with regard to the orientation as shown in the drawings, and is not intended to limit a working embodiment to any particular orientation. As discussed in further detail below, the cathode 12 for each electrochemical cell is a single cathode that is supported by the lower base 20. The lower base 20 defines an opening 22 for each electrochemical cell 10, and each opening is configured to be the oxidizer input 18 for the respective electrochemical cell, as discussed in further detail below. As shown in FIG. 1, a gasket 24 is located between the lower base 20 and the cathode 12 so as to provide a seal between the cathode 12 and the lower base 20. The gasket 24 is configured to substantially prevent any fluids, such as an electrolyte, from leaking out of the system.

In other embodiments, the cathode for each cell may be provided by smaller, separate, and individual cathodes instead of a larger "single cathode." Thus, the use of a single cathode is not intended to be limiting.

The lower base 20 is also configured to receive an anode holder 26 that is constructed and arranged to hold the at least one anode 14 (and in the illustrated embodiment four anodes are provided). The anode holder 26 will be discussed in greater detail below. The anode 14 (and specifically a filter body 62 thereof, discussed below and shown in FIG. 8) may be retained in the anode holder 26 by a retainer 28, such as a clip, although any suitable securing device may be used. The lower base 20 and the anode holder 26 are configured so that their respective top surfaces are substantially coplanar, i.e., reside in the same plane, upon assembly of the system. As further illustrated in FIG. 1, the electrochemical cell 10 includes a gasket 30 that extends across the anode holder 26 and the lower base 20.

A transition member 32 is disposed on top of the gasket 30, and a further gasket 34 is disposed on top of the transition member 32. The transition member 32 is discussed in further detail below. A manifold 36 is in contact with the gasket 34 on an opposite side of the transition member 32. The manifold 36 includes the fuel and electrolyte inlet 16 and an electrolyte and by-product outlet 38. As an option, the electrolyte and by-product outlet 38 may be connected to a system that may be used to separate the by-product of the electrochemical reactions of the electrochemical cell system 1 from the electrolyte, although the by-product does not need to be separated for the electrolyte to be reused. The by-product may be separated from the electrolyte to prevent clogging of the cell.

The entire assembly may be clamped together with a plurality of fasteners (not shown) that may be inserted into aligned holes 40 provided in the various structures, or with any other suitable clamp so that the gaskets 24, 30, 34 seal the various components of the electrochemical cell system 1 together to substantially prevent fluids from leaking out of the electrochemical cell system 1. Although the overall system is illustrated as having a substantially rectangular shape, any suitable shape and configuration may be used and the illustrated configuration is not limiting.

Figure 5:
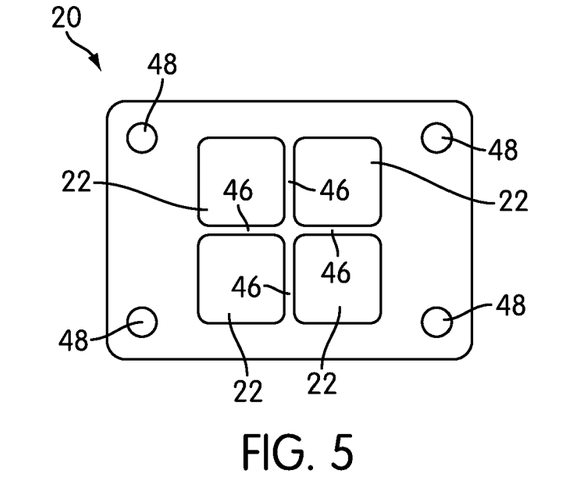
FIG. 5 is a bottom view of a lower base of the electrochemical cell system of FIG. 1.
Figure 6:
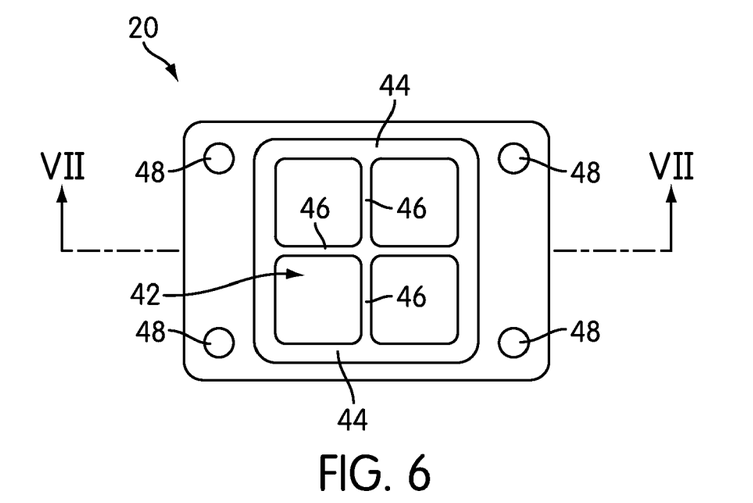
FIG. 6 is a top view of the lower base of FIG. 5.
Figure 7:
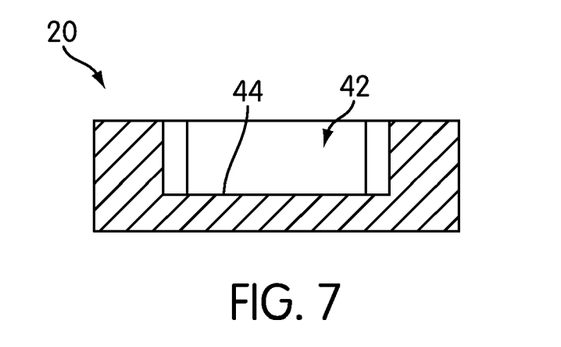
FIG. 7 is a cross-sectional view of the lower base of FIG. 6, taken along line VII-VII.

The lower base 20 is shown in greater detail in FIGS. 5-7. As stated above, the lower base 20 is configured to support the cathode 12. More specifically, the lower base 20 includes a cavity 42 that provides a support surface 44 that is configured to support the cathode 12. The openings 22 discussed above extend all the way through the lower base 20. Ribs 46 that separate the openings 22 also partially define the support surface 44 and are configured to support a center portion of the cathode 12. Thus, the cathode 12 is disposed in the cavity 42 and engaged with the supporting surface 44 (and the gasket 24 described above) so that the cathode 12 is exposed through the four "windows" 22 defined by the ribs 46. This configuration allows for a single cathode 12 to be simultaneously used by all four electrochemical cells 10, as discussed in further detail below. The lower base 20 may also include threaded openings 48 that are configured to receive the fasteners that are used to clamp the entire electrochemical cell system 1 together. The lower base 20 may be made from any suitable non-conductive material, such as plastic.

The cathode 12 generally comprises a porous body covered on the outer side by a gas permeable layer through which an oxidizer may diffuse, but the electrolyte may not pass through. That is, the layer is gas permeable, but not permeable by the electrolyte (i.e. it is gas permeable but not liquid permeable). As an option, the porous body may also be covered on the inner side by a liquid permeable layer through which the electrolyte may pass through so that the electrolyte may contact the porous body. The porous body of the cathode 12 has a high surface area and comprises a catalyst material that has a high activity for an oxidizer reduction reaction. In the illustrated embodiment, the cathode 12 has a substantially planar configuration. As illustrated in FIG. 1, the cathode 12 also has a rectangular, more specifically square, configuration. This illustrated configuration, however, is not limiting, and the cathode 12 could have any other shape or configuration other than that illustrated.

The cathode may be a passive or "breathing" cathode that is passively exposed, such as through the windows or openings 22, to the oxidizer source (typically oxygen present in ambient air) and absorbs the oxidizer for consumption in the electrochemical cell reactions. That is, the oxidizer, typically oxygen, will permeate from the ambient air into the cathode 12. Thus, the oxidizer need not be actively pumped or otherwise directed to the cathode, such as via an inlet. Any part of the cathode 12 by which the oxidizer is absorbed or otherwise permeates or contacts the cathode 12 may be generically referred to as an "input." The term input may broadly encompass all ways of delivering oxidizer to the cathode (and that term may similarly be used with reference to any way of delivering fuel to the anode). In the illustrated embodiments, the openings 22 in the lower base 20 define the inputs 18 for oxidizer, because the openings allow the oxidizer to come into contact with the cathode 12.

The cathode 12 includes a catalyst material, such as manganese oxide, nickel, pyrolized cobalt, activated carbon, platinum, or any other catalyst material or mixture of materials with high oxygen reduction activity in the electrolyte for catalyzing reduction of the oxidizer, which will be discussed below. The porous body of the cathode 12 may comprise the catalyst material. In an illustrated embodiment, and particularly for portable applications, the cathode 12 may have a thickness of about 1 mm or less, and may have a length of about 3.7 cm and a width of about 3.7 cm. Of course, such dimensions are provided as examples and are not intended to be limiting in any way. Such cathodes are commercially available and therefore a more detailed description of the cathode is not provided herein.

Figure 8:
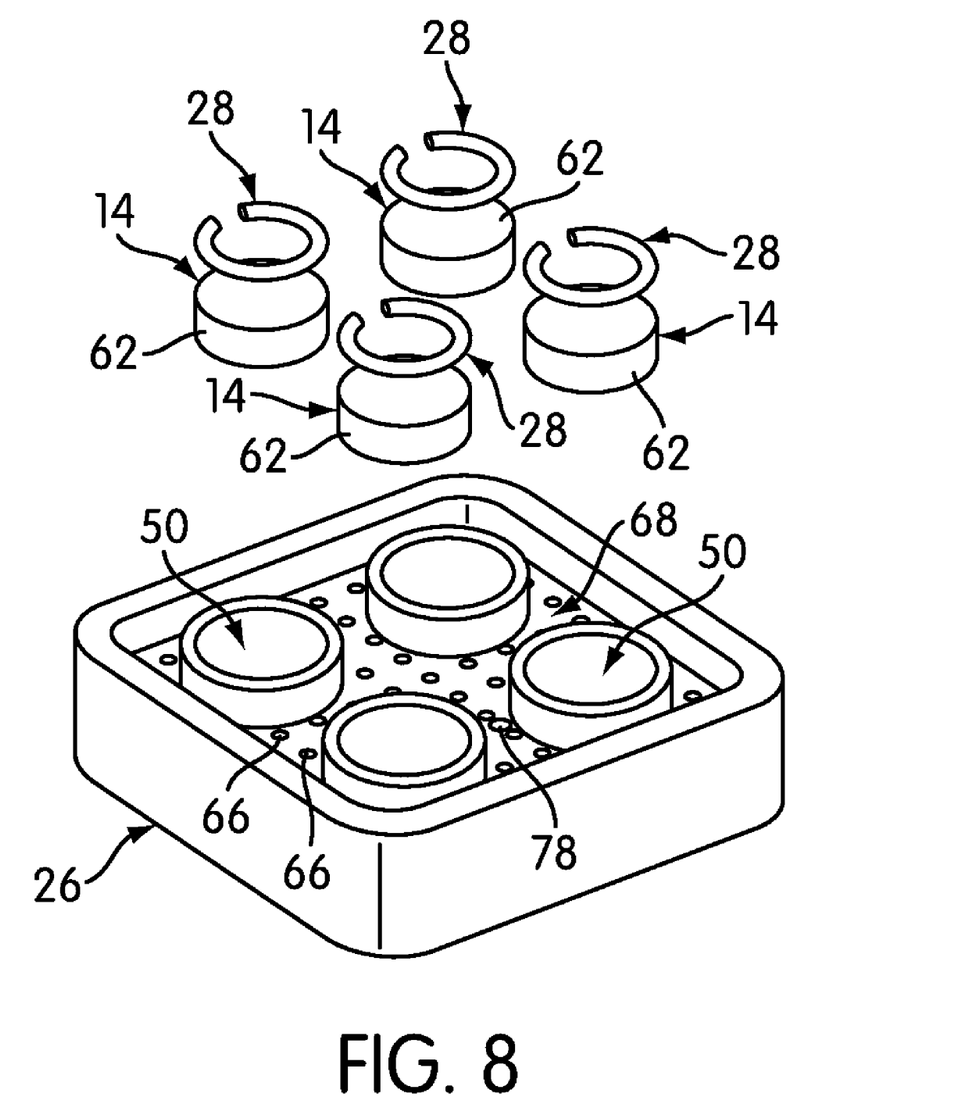
FIG. 8 is an exploded, perspective view of an anode holder and a plurality of anodes of the electrochemical cell system of FIG. 1.
Figure 9:
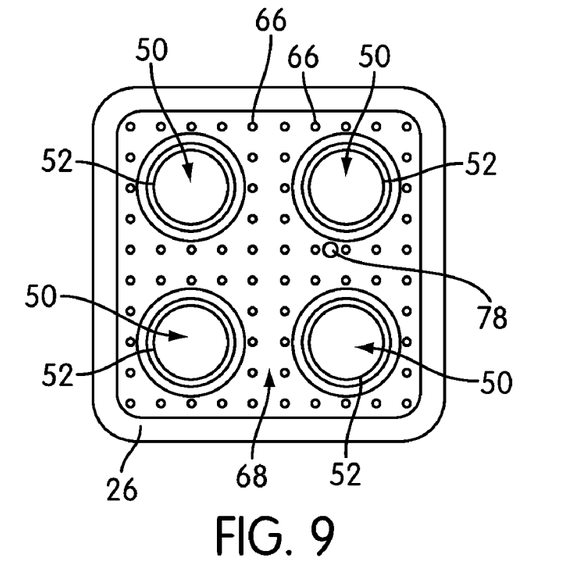
FIG. 9 is a top view of the anode holder of FIG. 8.
Figure 10:
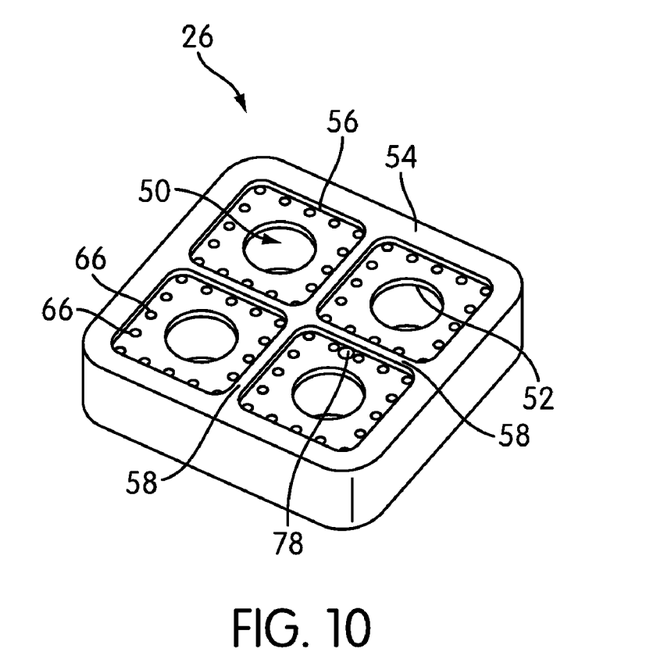
FIG. 10 is a bottom perspective view of the anode holder of FIG. 8.

Details of the anode holder 26 are shown in FIGS. 8-10. As shown in FIG. 8, each anode 14 (and particularly the filter body 62 thereof) is received by an anode receiving space or cavity 50 of the anode holder 26. Similar to the support surface 44 of the lower base 20, a support surface 52 (shown in FIG. 9) is provided at a lower end of the anode receiving space 50. The support surface 52 is configured to support the anode 14 and prevent the anode from contacting the cathode 12 after the electrochemical cell system 1 has been assembled. As discussed above, each anode 14 may be retained within the anode receiving space 50 by the retainer 28. The retainer 28 prevents the anode 14 from "floating" within the anode receiving space 50 after the system has been filled with electrolyte. The retainer 28 may be a resilient material that presses against the anode holder 26 in the anode receiving space 50 for an interference-type fit. The retainer 28 may be removed from the anode holder 26 so that the anode 14 may be removed from the anode holder 26, if needed. In other variations, the anode(s) may be retained by any suitable means, such as being retained in a non-removable manner.

FIG. 10 illustrates a bottom side of the anode holder 26, i.e., the side that faces the cathode 12. The bottom side of the anode holder 26 includes a bottom surface 54 that is configured to directly contact an upper surface of the cathode 12. As shown in FIG. 10, a plurality of recesses 56 are provided in the bottom surface 54 so as to form ribs 58. The ribs 58 of the anode holder 26 are generally aligned with the ribs 46 of the lower base 20 upon assembly of the system 1. The ribs 58 substantially separate the four electrochemical cells 10 from each other into four different chambers. The ribs 58 may also be configured to substantially prevent the electrolyte from flowing between the different electrochemical cells 10. The delineation that is provided by the ribs also allows for a single cathode 12 to be used for all four electrochemical cells 10 (or whatever number may be used).

Each recess 56 in the anode holder 26 corresponds to one of the electrochemical cells 10, and the depth of each recess 56 defines a gap 60 between the anode 14 and the cathode 12 when the electrochemical cell system 1 is assembled. The gap 60 will typically be an essentially empty gap for permitting fluid flow from the anode 14 to the cathode 12 and then back out the return channels 66 (discussed below). Preferably, the gap 60 is essentially constant, but in some configurations it may be altered. The fluid flow into, through, and out of the gap 60 will be discussed in further detail below.

In an embodiment, the gap 60 between the anode 14 and the cathode 12 may have channels or other features for facilitating flow of electrolyte and oxidized fuel (as discussed below), but does not have a proton exchange membrane, and instead allows fluid flow of the electrolyte and oxidized fuel into the gap 60, as discussed below. For example, the gap 60 could be occupied by a porous, non-reactive, and non-conductive spacer that still allows the flow, such as a spacer having a honeycomb configuration or a porous frit. Preferably, the gap 60 is an open space that allows for convective flow, as discussed in further detail below.

In the illustrated embodiment, the anode 14 has a substantially cylindrical configuration. However, this configuration is not intended to be limiting, and the anode could have any other shape or configuration other than that illustrated. The anode 14 comprises the filter body 62. The filter body 62 is configured to allow the electrolyte to flow through it, while filtering or separating the fuel particles out of the electrolyte. The term "filter" should be broadly construed as a structure that can be used to separate and capture the fuel from the electrolyte, even if the fuel is not in its pure form. It is the combination of the filter body 62 and the captured fuel particles that essentially comprise the anode 14. In an embodiment, the filter body 62 may be a carbon filter that is made from carbon fiber, a tightly woven mesh of brass, bronze, stainless steel, nickel, monel, any other high conductivity filter material, or any other filter material.

Other materials or methods of forming the filter body 62 of anode 14 may be used. For example, the filter body may include channels, grooves, bores, pores, mesh, or any other formations able to capture and retain particles of the fuel from the electrolyte flowing through it. In an embodiment, the filter body 62 may include one or more screens of brass, bronze, stainless steel, nickel, monel, or any other high conductivity material. The filter body 62 may be any other conductor that can effectively act as a filter. In an embodiment, the fuel may be separated from the electrolyte via an electrochemical reaction, such as electrodeposition of the fuel onto the screen(s) to create the anode.

Figure 3:
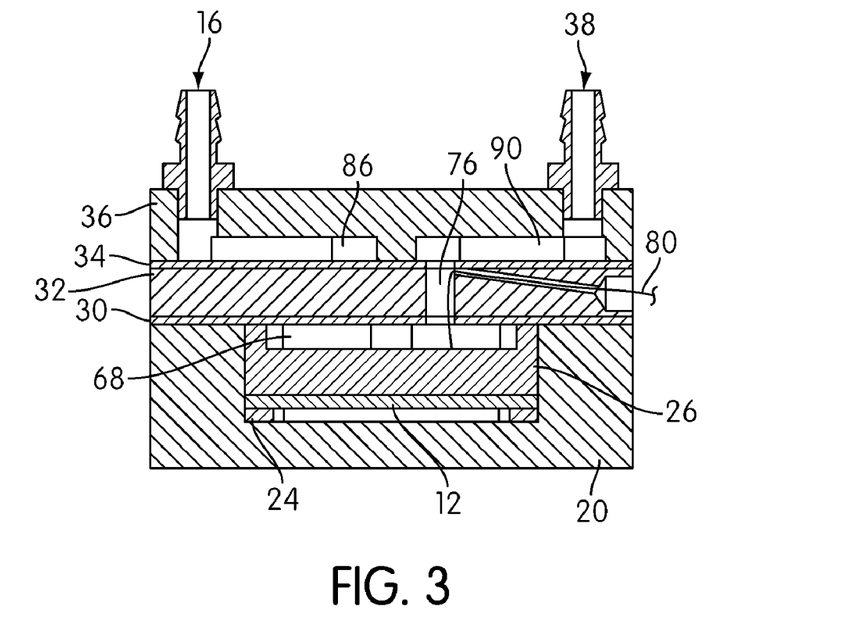
FIG. 3 is a cross-sectional view of the electrochemical cell system of FIG. 2, taken along line III-III.
Figure 13:
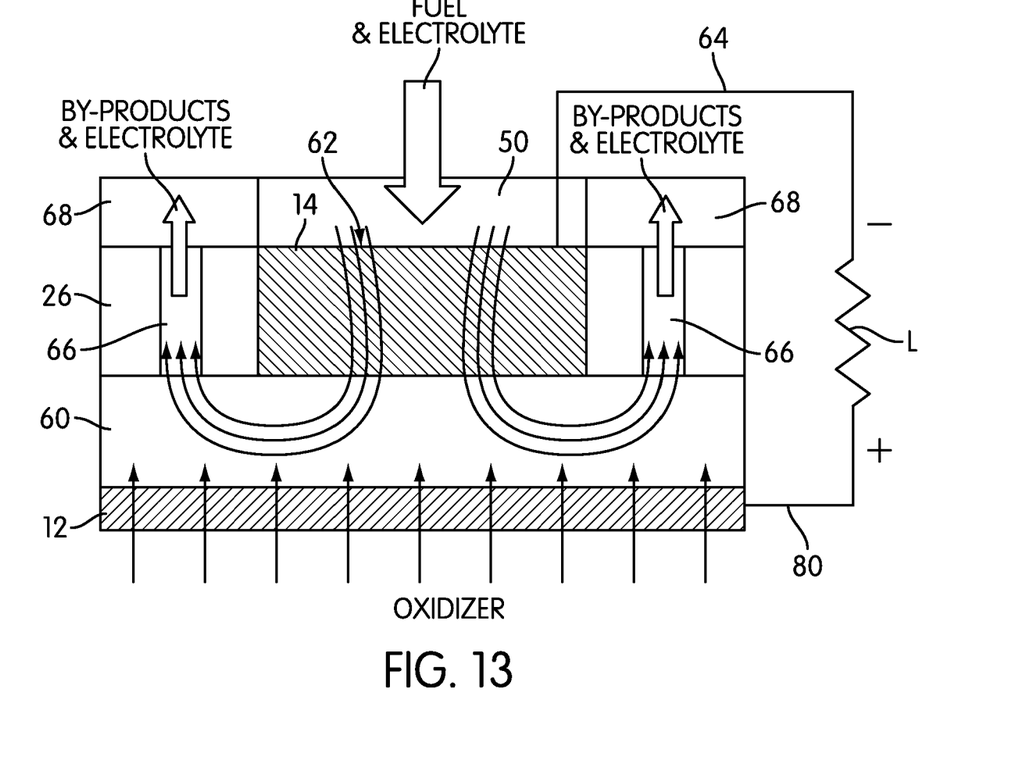
FIG. 13 is a schematic view of flows within the electrochemical cells of FIG. 1.

In addition to holding the filter body 62 in place, the retainer 28 may be used to provide an electrical connection to a load L via an electrical lead 64, such as a wire (shown in FIG. 3 and represented schematically as a negative (−) terminal in FIG. 13). The electrical lead 64 may be routed from the retainer 28 and out of the electrochemical cell 10 via the transition member 32, as discussed in further detail below. In embodiments where a conductive screen is used as at least part of the filter body 62, the electrical lead 64 may be connected directly to the screen.

In an embodiment, and particularly for portable applications, the filter body 62 of the anode 14 may be approximately 0.5 cm thick and 1 cm in diameter. Such an example is not intended to be limiting in any way, and the filter body 62 may have other sizes and configurations. For example, for larger scale non-portable electrochemical cells, the size may be much larger, and for a smaller scale electrochemical cell, the size may be much smaller.

Oxidation of the fuel at the anode 14 provides oxidized fuel ions that may exit the filter body 62 and enter the gap 60, along with the electrolyte. By retaining the fuel particles in the filter body 62, a constant source of released or liberated electrons and resulting fuel ions may be provided. As the fuel particles become depleted, additional fuel particles may flow into the system with the electrolyte via the inlet 16.

As illustrated in FIGS. 8-10, each electrochemical cell 10 has a plurality of return channels 66 that circumferentially surround and extend parallel to the anode receiving space 50 in the anode holder 26. Each return channel 66 has a cross-sectional area that is substantially smaller than the cross-sectional area of the anode receiving space 50. Although a total of sixteen channels 66 are illustrated for each electrochemical cell 10, more or less channels having any suitable cross-section may be used. The channels 66 are sized to provide a positive return flow of the electrolyte carrying the by-product of the electrochemical reaction carried out in the electrochemical cell 10 to the electrolyte and by-product outlet 38. Specifically, each channel 66 communicates the gap 60 to a return space 68 that is defined by the anode holder 26 and the gasket 30 that seals a top side of the anode holder 26; and this return space 68 is communicated to the outlet 38 as discussed below. In the illustrated non-limiting embodiment, the return space 68 is a common space shared by all four electrochemical cells 10 of the electrochemical cell system 1. Further, walls providing an extension of the anode receiving spaces 50 to the transition member 32 separate the return space 68 from the anode receiving spaces 50 in this region. Such a configuration allows for a single return out of the electrochemical cell system 1, as discussed in further detail below. The anode holder 26 is preferably made from a non-conductive, lightweight material, such as plastic, although any suitable material may be used.

Other suitable constructions and configurations for the holder 26, the channels 66 and the return space 68 may also be used and the illustrated embodiment is not regarded as limiting.

Figure 4:
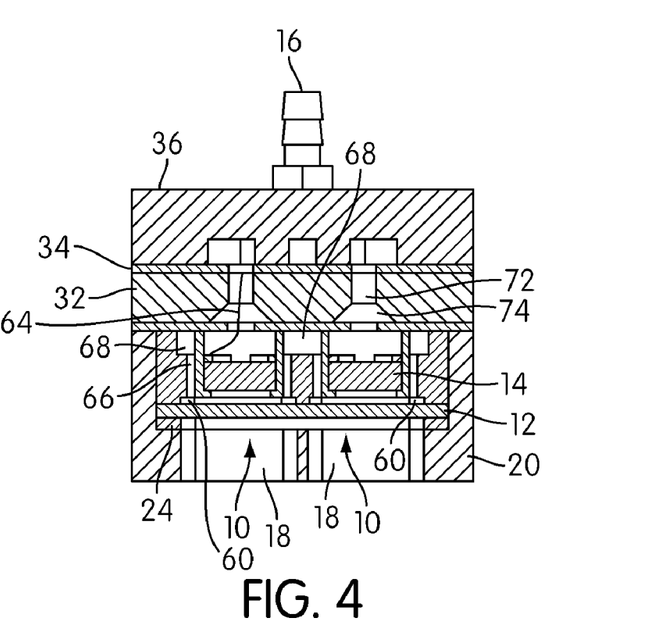
FIG. 4 is a cross-sectional view of the electrochemical cell system of FIG. 2, taken along line IV-IV.
Figure 11:
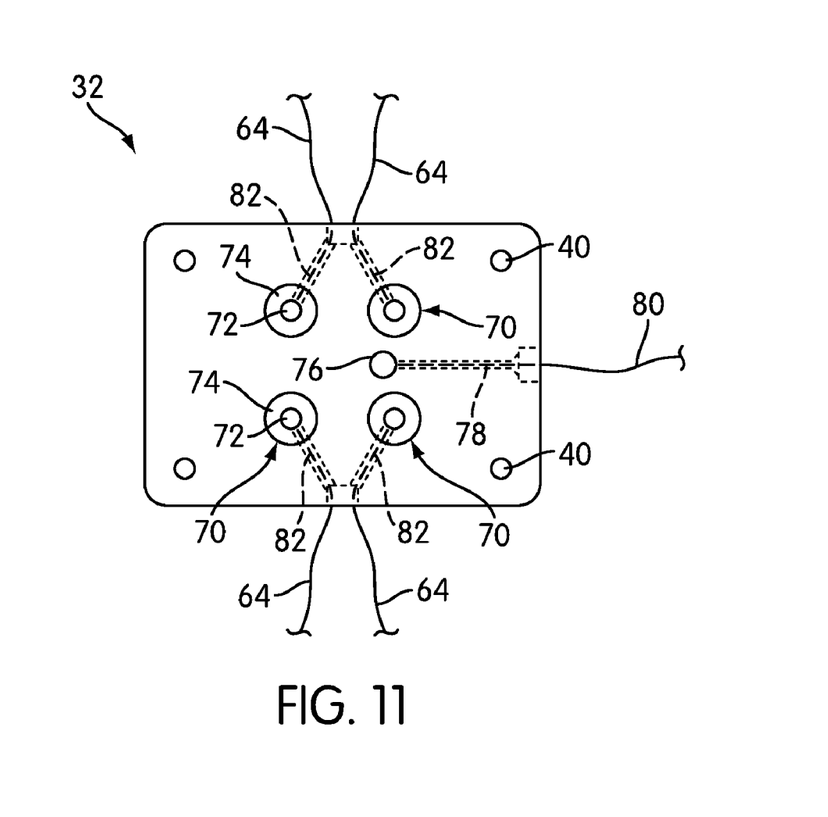
FIG. 11 is a bottom view of a manifold of the electrochemical cell system of FIG. 1.

As illustrated in FIG. 11, the transition member 32 includes a plurality of supply ports 70. Each of the ports 70 is configured to be aligned with each anode receiving space 50 of the anode holder 26, and, hence, with each respective anode 14 upon assembly of the electrochemical cell system 1. As illustrated in FIGS. 4 and 11, an upstream section 72 of the port 70 is substantially cylindrical in shape and has a substantially constant diameter, and a downstream section 74 of the port 70 is substantially frustoconical in shape, such that the diameter at the downstream-most position is greater than the diameter that is connected to the upstream section 72. The term "upstream" as used herein is intended to mean closer to the fuel and electrolyte source than the anode 14, and the term "downstream" as used herein is intended to mean closer to the anode 14 than the fuel and electrolyte source. By having the downstream section 74 of the port 70 in the transition member 32 increase in diameter and cross-sectional area along the flow path of the fuel and electrolyte, a pressure drop may be created. The creation of the pressure drop just upstream of the anode 14 may allow for a more constant flow of the electrolyte and fuel as they enter the filter body 62 of the anode 14.

The transition member 32 also includes a single return port 76 that is configured to allow the electrolyte and the by-products of the electrochemical reactions in the electrochemical cells 10 to flow from the return space 68 in the anode holder 26 towards the outlet 38. Although a single return port 76 is shown, it is understood that additional ports may be used to provide passageways for the flow of the electrolyte and by-product away from the return space 68 and anodes 14. As shown in FIG. 11, the return port 76 is connected to a channel 78 that is configured to receive an electrical lead 80, e.g., wire, that may be connected to the cathode 12 and to the external load L (which is also represented schematically as a positive terminal in FIG. 13). Although the electrolyte and by-products are not likely to exit the electrochemical cell system 1 via the channel 78 due to the increase in pressure that would be created by flow through the channel 78, suitable seals may be used to prevent the electrolyte and by-products from leaking into the channel 78 and out of the electrochemical cell system 1.

The electrical lead 80 for the cathode 12 may be routed through the channel 78 of the transition member 32, into the return port 76 of the transition member 32, through the return space 68 of the anode holder 26, through the anode holder 26 through one of the channels 66 or through a separate channel 82 that is configured for the electrical lead 80, through the gap 60, and into contact with the cathode 12. Of course, other paths may be used to connect the load to the cathode 12. The illustrated embodiment is not intended to be limiting in any way.

As shown in FIG. 11, an electrical lead channel 82 may be provided for each electrical lead 64 that connects each anode 14 to the external load. The electrical lead channels 82 may be similar in configuration as the channel 78 described above. The electrical lead 64 for each anode 14 may be routed through the channel 82, into the port 70 and to the retainer 28 of the anode 14, thereby providing an electrical connection between the anode 14 and the external load. Of course, other paths may be used to connect the load to the anode 14, and the illustrated embodiment is not intended to be limiting in any way. Connections between the anode 14 and an external load L and the cathode 12 and the external load L are schematically illustrated in FIG. 13.

Figure 12:
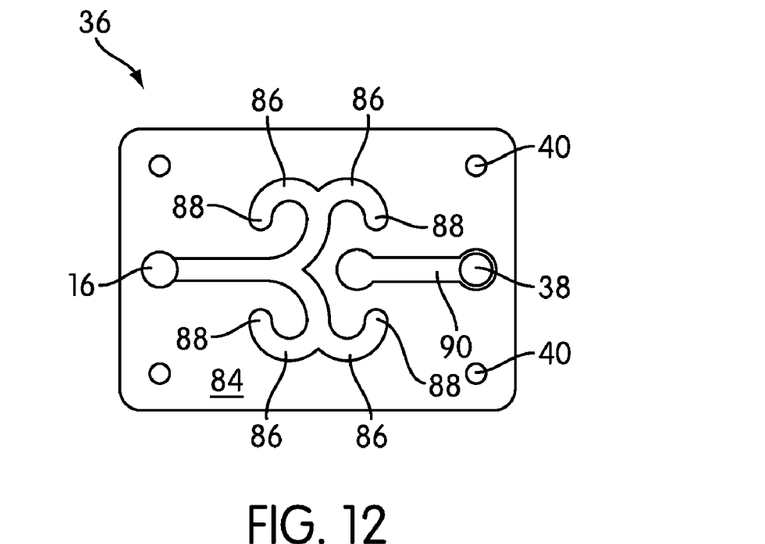
FIG. 12 is a bottom view of a cover of the electrochemical cell system of FIG. 1.

FIG. 12 illustrates a bottom (i.e., internal) side 84 of the manifold 36. The bottom side 84 includes a plurality of inlet pathways 86 that are all connected to the fuel and electrolyte inlet 16. The pathways 86 are closed off by the top surface of the gasket 34 that is located between the manifold 36 and the transition member 32. Each of the pathways 86 has a distal end 88 that is connected to one of the ports 70 of the transition member 32 when the electrochemical cell system 1 is assembled. As shown, each pathway 86 may be curved so that there is no place for the particles of the fuel to collect, i.e., there are no flow "dead spots" that may clog the flow of the electrolyte and fuel particles over time. This also increases turbulence in the flow to help keep the fuel particles agitated and suspended in the flow. The bottom side 84 of the manifold 36 also includes a single outlet pathway 90 that is configured to connect the return port 76 of the transition member 32 to the electrolyte and by-product outlet 38. Although the outlet pathway 90 is illustrated as being straight, it may be curved like the inlet pathways, although such a configuration is generally not necessary, because there should be no fuel particles in the outlet flow of the electrolyte.

The filter body 62 of the anode 14 is communicated to the fuel and electrolyte source for receiving the flow of the fuel and the electrolyte. This may be done by a fuel input in the form of the fuel and electrolyte inlet 16 upstream of the filter body 62. Upstream is defined as relative to the flow through the anode 14 and its filter body 62. In an embodiment, the inlet is aligned directly with the anode 14 and its filter body 62. Preferably, the fuel and electrolyte source comprises a single source with the fuel mixed with the electrolyte. However, it is also within the scope of the present invention to use separate sources for the fuel and electrolyte and deliver them separately to electrochemical cell 10 and mix them just upstream of the anode 14.

In the illustrated embodiment, the fuel inlet is in the form of the pathway 86 that is formed in the manifold 36 and fluidly communicates the fuel and electrolyte source to the anode 14. As discussed above, the pathway 86 is in fluid communication with the fuel and electrolyte source, as well as the port 70 of the manifold for delivering the fuel and the electrolyte to the transition member 32. Any suitable connections, conduits, channels, or passages may be used to communicate the fuel and electrolyte from their source(s) to the anode 14.

During operation, the solid fuel particles collect on the filter body 62 as the electrolyte flows through it. By collect, this term is meant to encompass the capture of the fuel in solid form on the electrode body, such as by filtering, electrodeposition, or any other suitable way. By solid, this term is meant to encompass anything that can be separated from the flow, such as by filtering or electrodeposition. Fuel oxidation occurs to oxidize the fuel into at least oxidized fuel ions that remain in the electrolyte and electrons for conduction by the anode 14 to the cathode 12 through the external load L, which is connected to the anode 14 and cathode 12 as shown in FIG. 13. The oxidation reaction will be discussed below.

The electrochemical cell 10 is configured to provide a pressure differential that creates a flow of the electrolyte through the anode 14, into the gap 60 and towards the cathode 12, radially away from the anode 14, and back into the channels 66 in the anode holder 26. Then, the electrolyte flows into the return space 68, through the return port 76 in the transition member 32, then through the passageway 90 found in the manifold 36, and out the electrolyte and by-product outlet 38.

Within the gap 60, a transport flow of the electrolyte flows across the gap 60 from the filter body 62 of the anode 14 to the cathode 12. The term "transport flow" refers to a fluid flow of the electrolyte across the gap, which transports the oxidized fuel ions away from the anode 14 and towards the cathode 12. Thus, the ions are transported convectively by the flowing electrolyte, rather than relying solely on conduction or diffusion within the electrolyte. In contrast, in electrochemical cells with proton exchange membranes, the membrane itself is an electrolyte that transports the oxidized fuel ions by conduction. Here, the primary direction of the transport flow is away from the anode 14 to the cathode 12 and then radially outward and back into the return channels 66, as opposed to the prior art approach where two streams of oxidizer and fuel are caused to flow along a path parallel to the anode and cathode. Stated differently, a vector or gradient describing the flow leaving the anode 14 would initially be primarily oriented from one electrode to the other (as opposed to being oriented parallel to the electrode) and then be primarily oriented to the return channels 66 in a return direction substantially parallel but opposite to the initial vector and radially outward of the flow leaving the anode 14, as shown in FIG. 13.

Although the electrochemical cell system 1 may be passively operated, such as by gravity feed or by motion of the device (e.g., for a portable cell, such as in a watch, kinetic energy from motion of the user could be used to generate the flow), in an embodiment, a flow generator, such as a small pump, may be used to generate flow of the fuel and electrolyte. The pump may be any suitable pump, such as a piezoelectric pump, a centrifugal pump, a gear pump, a peristaltic pump, etc. The pump may be used in various configurations and in electrochemical cells 10 of various sizes. The flow generator could have any construction or configuration. Thus, the term flow generator is intended to broadly encompass both active powered and passive non-powered mechanisms for generating flow.

Prior to entering the electrochemical cell system 1 illustrated in the Figures, the fuel may be fed by an auger system, a venturi, or any other suitable system to transport the fuel particles from a fuel supply, such as a dry container, to the electrolyte. The electrolyte may be transported from an electrolyte supply to a suitable vessel that may be used to mix the fuel with the electrolyte, such as a "water column." Once the fuel particles are suspended in the electrolyte, the fuel and the electrolyte may be provided to the anode by the flow generator.

As can be seen from FIG. 13, the initial flow leaving the anode 14 and the return flow entering the return channels 66 run counter to one another in an adjacent and overlapping manner (referred to as counterflow). Preferably, but not necessarily, the return channels 66 peripherally surround the anode 14 and its receiving space 50 so that the initial flow leaving the anode 14 is surrounded by and within the return flow flowing towards and into the return channels 66. Preferably, but not necessarily, the anode 14 is at or aligned with the center of the geometry defined by the return channels, thus providing for an even distribution of the flow to all the return channels 66.

Any such electrically powered flow generator may be coupled directly or indirectly to the anode and cathode so that it can draw power, thus providing a self-powering electrochemical cell 10. A battery or other alternative power source may be provided to initially power such a flow generator, and a switch may be used to enable the generator to draw power from the anode and cathode or the alternative power source as needed. A controller may switch the flow generator from the initial power source to the electrochemical cell output power either (i) at a predetermined time after the electrochemical cell operation has started, or (ii) when it detects that the electrochemical cell power output has reached a level sufficient to self-power the flow generator.

The oxidizer may be delivered to the cathode 12 by a passive transport system. For example, where oxygen present in ambient air is the oxidizer, simply exposing the cathode 12 to ambient air via the openings 22 may be sufficient to allow diffusion/permeation of oxygen into the cathode porous body (and the portion where the diffusion enters the cathode may be regarded as the oxidizer input 18). Other suitable oxidizers may be used and embodiments described herein are not limited to the use of oxygen as the oxidizer.

In other embodiments, a pump, such as an air blower, may be used to deliver the oxidizer to the cathode 12 under pressure. The oxidizer source may be a contained source of oxidizer. Likewise, when the oxidizer is oxygen from ambient air, the oxidizer source may be broadly regarded as the delivery mechanism, whether it be passive (e.g., access openings 22 for the air) or active (e.g., pumps, blowers, etc.), by which the air is permitted to flow to the cathode 12. Thus, the term "oxidizer source" is intended to encompass both contained oxidizers and/or arrangements for passively or actively delivering oxygen from ambient air to the cathode 12.

During operation, when the anode 14 and the cathode 12 are coupled to the load L, reaction among at least the oxidizer and the electrons flowing to the cathode 12 will occur at the cathode, thus reducing the oxidizer. The reduced oxidizer ions may react with the oxidized fuel ions to complete the electrochemical cell reaction. The oxidizer reduction reaction will be discussed below.

The fuel may be a metal, such as iron, zinc, aluminum, magnesium, or lithium. By metal, this term is meant to encompass all elements regarded as metals on the periodic table, including but not limited to alkali metals, alkaline earth metals, lanthanides, actinides, and transition metals, either in atomic or molecular form when collected on the electrode body. However, the present invention is not intended to be limited to any specific fuel, and others may be used. For example, the fuel may include oxidizable organic solids or immiscible liquid fuel micelles. The fuel may be provided to the electrochemical cell system as particles suspended in the electrolyte. For example, the fuel may be flakes, small spheres, or dendrites of zinc. The particles may be as small as about 1 µm and as large as about 1 mm or even larger. In an embodiment, the particles have an average size (i.e., effective diameter) of about 300 µm. The amount of fuel particles that are provided in the flow of electrolyte depends on the amount of particles still located in the anode. For example, if there are enough fuel particles in the anode to create the desired amount of electricity, then no additional fuel particles need to be provided to the anode via the electrolyte. However, if the amount of fuel particles becomes depleted to a level where the performance of the electrochemical cell decreases by a noticeable amount, the anode may be refueled by providing a high concentration of fuel particles in the electrolyte for a short burst of time. Once the fuel particles are collected at the anode in the porous body, and the performance of the electrochemical cell resumes to its desired operating level, the electrolyte may be provided to the electrochemical cell without fuel particles until the amount of fuel particles becomes depleted again. A suitable controller may be provided to monitor the power output and control the feeding of the fuel particles.

The electrolyte may be an aqueous solution. Examples of suitable electrolytes include aqueous solutions comprising sulfuric acid, phosphoric acid, triflic acid, nitric acid, potassium hydroxide, sodium hydroxide, sodium chloride, potassium nitrate, or lithium chloride. The electrolyte may also use a non-aqueous solvent or an ionic liquid. In the non-limiting embodiment described herein, the electrolyte is aqueous potassium hydroxide.

To limit or suppress hydrogen evolution at the anode, salts may be added to retard such a reaction. Salts of stannous, lead, copper, mercury, indium, bismuth, or any other material having a high hydrogen overpotential may be used. In addition, salts of tartrate, phosphate, citrate, succinate, ammonium or other hydrogen evolution suppressing additives may be added. In an embodiment, metal fuel alloys, such as Al/Mg may be used to suppress hydrogen evolution.

Turning to the specific reactions in one non-limiting embodiment, potassium hydroxide is used as the electrolyte (which is alkaline), zinc (Zn) particles are used as the fuel, and oxygen ($O_2$) from ambient air is used as the oxidizer.

At the anode, the zinc is oxidized, as represented by equation (1):

$$Zn + 4OH^- \rightarrow Zn(OH)_4^{2-} + 2e^- \quad (E° = -1.216V) \quad (1)$$

At the cathode, oxygen is reduced, as represented by equation (2):

$$2e^- + \tfrac{1}{2}O_2 + H_2O \rightarrow 2OH^- \quad (E° = 0.401V) \quad (2)$$

In solution, the following reaction occurs as represented by equation (3):

$$Zn(OH)_4^{2-} \rightarrow ZnO + H_2O + 2OH^- \quad (3)$$

Thus, the zinc is oxidized at the anode and its positive ion ($Zn^{2+}$) is supported by four $OH^-$ ions to create the complex anion $Zn(OH)_4^{2-}$. The concentration of $OH^-$ ions in the electrolyte solution is maintained by the oxidizer reduction reaction at the cathode and the release of the $OH^{-1}$ ions from reaction of the $Zn(OH)_4^{2-}$ anion. The electrolyte flow transports the relatively unstable $Zn(OH)_4^{2-}$ ion away from the anode, thus preventing the zinc ion from reducing back to zinc at the anode 14 (which in turn improves efficiency, as electrons are free to flow through the load L rather being consumed by reduction of the zincate ion). And, in the electrolyte, the complex $Zn(OH)_4^{2-}$ anion reacts in the solution to provide water ($H_2O$), $OH^-$ ions, and zinc oxide (ZnO), which is present in the electrolyte. The zinc oxide (ZnO) is formed by the removal of two of the $OH^-$ ions from the zincate anion ($Zn(OH)_4^{2-}$), the remaining two $OH^-$ ions react to form one water molecule ($H_2O$) and the ZnO product.

Thus, the overall reaction between the reduced oxidizer ($OH^{-1}$) ions and the oxidized zinc ($Zn^{2+}$) ions provides the intermediary by-product of $Zn(OH)_4^{2-}$, which ultimately reacts to become zinc oxide (ZnO). As can be seen from the representative reaction equations set forth above, the remaining constituents of the reactions balance out (i.e., they are consumed or created in equal amounts). Thus, in its simplest form of expression, the overall reaction at the anode reduces the oxidizer at the cathode 12 with electrons received from the load, oxidizes the fuel particles at the anode to supply electrons to the load, and reacts the reduced oxidizer ion and oxidized fuel ions to form a by-product, in this case zinc oxide. The transport flow in the direction from the anode towards the cathode helps support and drive this process and increases the overall power output.

Additional intermediary reactions may occur at the anode and/or the cathode and/or in the gap, and the described reactions are not intended to be exclusive of any side or intermediary reaction. Also, the reactions are representative and may be expressed differently, but the general overall reaction results in the oxidation of zinc and reduction of oxygen to produce the by-product of zinc oxide (ZnO) and electrical current that drives the load L. The zinc oxide by-product may flow out of the electrochemical cell with the electrolyte. As an option, the zinc oxide may be recovered from the flow and the zinc may be separated and reintroduced into the fuel and electrolyte source.

Although the directional flow in the anode-cathode direction helps increase the power output, in certain situations or applications, it may be desirable to cease the flow. Even when the flow is stopped, some power may be generated, although the power output would be significantly less than when the electrolyte is flowing and transporting the oxidized fuel ions away from the anode 14 and towards the cathode 12. This "passive operation" state with no or essentially no flow may be useful for powering devices with a standby mode (e.g., a laptop computer) or some other mode where only a small amount of power is required. A suitable controller may be used to control whatever flow generator is provided for generating the flow to switch between this passive state and an active state where the transport flow is present.

In designing the various parts, the structures and various channels can be manufactured on the microfluidic scale to achieve a small, compact size, which is best suited to portability. Various techniques from the formation of microelectronics may be used, such as lithography, thin film deposition, electrochemical processing, and microfluidic processing methodologies may be used. These techniques may be used to enable large scale manufacturing of electrochemical cells designed in accordance with the present invention.

The electrolyte and the resulting product of the fuel/oxidizer reaction (e.g., zinc oxide) exits the electrochemical cell 10 through the anode holder 26 via the channels 66 of the anode holder 26.

Preferably, but not necessarily, an electrochemical cell constructed in accordance with this invention, including any embodiment described above or below, may be used in portable applications, such as for powering laptops, cell phones, portable audio players, wireless e-mail devices, medical equipment, or any other device for which portability by a person is desirable. However, it should be understood that the present invention may be practiced on larger scale, non-portable devices, and the advantage of portability is not intended to be limiting. To the contrary, the present invention is not limited to portability, but it is believed to be particularly useful for achieving portability.

As can be seen from this disclosure, the electrochemical cell of the present invention provides a number of non-limiting advantages, including but not limited to:

most metal particulates are stable and non-volatile, thus rendering their use in portable items relatively safe (as opposed to fuel cells that use a combustible fuel);
  the use of a filter that captures the particulate oxidizable fuel allows the fuel to be readily replenished by adding more to the flowing electrolyte;
  the flow in the anode to cathode direction increases the overall power output;
  the flow rate and/or the amount of fuel in the flow may be regulated to adjust the power output;
  the flow may be stopped to allow the system to operate in a low power output passive state;
  the by-product of the fuel-oxidizer reaction may be a precipitate that can be easily separated from the electrolyte, thus allowing for re-use/re-circulation of the electrolyte;
  the presence of one or more return channels adjacent to the anode space/cavity allows for each individual electrochemical cell to have its own transport and return flow paths without interfering with the operation of an adjacent electrochemical cell, thus providing for a wide range of freedom in constructing multiple electrochemical cell arrays; and
  the return channel configuration also provides for a compact design.

An electrochemical cell designed in accordance with any aspect of the present invention need not have all these advantages, and various aspects of the invention may achieve one, some, or all of these advantages depending on the specific embodiment implemented. For example, it is not necessary for each individual electrochemical cell to have its own transport and return flow paths without interference with the operation of an adjacent electrochemical cell for the cells to operate. In an embodiment, adjacent electrochemical cells may be configured to operate in series such that the electrolyte may flow between cells. The illustrated embodiment is not intended to be limiting in any way.

In some embodiments of the invention, the fuel may be collected at the anode by electrodeposition. In such an approach, the anode body is not necessarily acting as a filter per se by capturing fuel particles from the electrolyte. Instead, the anode body's potential is changed so that it acts as a cathode for the reduction of the fuel ions, thus causing fuel cations in the electrolyte to deposit on the body. Thus, the anode body may be broadly characterized as being a permeable body, which includes any body on which the fuel can collect (either by filtering, electrodeposition, or otherwise) and through which the electrolyte can flow.

This electrodeposition approach may be used advantageously in certain embodiments where the reaction between the oxidized fuel ions and the reduced oxidizer ions to form the by-product is reversible. For example, in the embodiment discussed above using zinc as the fuel, the zinc oxide by-product may be allowed to accumulate and remain in the electrolyte as a suspension or colloid during operation. Then, to re-charge the anode body with zinc fuel, a cathodic potential can be applied to the anode body (which is now really acting as a cathode), to cause the zinc cations from the zinc oxide to deposit on the anode body. An additional electrode that acts as an anode when the cathodic potential is applied to the anode body may also be used. With the ability to discharge and re-charge, the cell may be used as a re-chargeable battery power supply or a re-chargeable back-up power supply.

In other aspects of the invention, the general cell architecture and arrangement of the counterflow between the portion of the flow leaving the anode 14 and the portion of the flow returning to the return channels may be used with non-particulate fuels and a more traditional fixed catalytic anode. For example, reference may be made to the above-incorporated U.S. patent application Ser. No. 11/962,803, filed Dec. 21, 2007, for teachings of suitable anode, cathode, electrolyte, fuel, and oxidizer materials in this regard. The advantage of the general flow arrangement is advantageous in the particulate fuel context, but may also be advantageously used with other types of electrochemical cells as well to enable systems comprising a number of orthogonal flow type cells to be arranged in parallel. Thus, the electrode through which the electrolyte flows may be generally referred to as a first electrode (which will typically be an anode), and the electrode on the opposite of the gap may be generally referred to as a second electrode (which will typically be a cathode, and preferably a breathing cathode). And likewise, the corresponding reactant that is oxidized or reduced at the first electrode may be referred to as the first reactant (which will typically be the fuel), and the corresponding reactant that is oxidized or reduced at the second electrode may be referred to as the second reactant (which will typically be the oxidizer). However, because the components may be reversed, the terms first and second may be used in a more generic sense to cover either alternative.

The foregoing illustrated embodiments have been provided solely for illustrating the structural and functional principles of the present invention and are not intended to be limiting. For example, the present invention may be practiced using different fuels, different oxidizers, different electrolytes, and/or different overall structural configuration or materials. Thus, the present invention is intended to encompass all modifications, substitutions, alterations, and equivalents within the spirit and scope of the following appended claims.

What is claimed is:

1. An electrochemical cell for use with an electrolyte, oxidizable solid fuel, and an oxidizer to generate electrical power, the electrochemical cell comprising:
   a permeable electrode body provided along a flow path for receiving a flow comprising at least the electrolyte, the permeable electrode body being configured to permit the electrolyte to flow therethrough, the permeable electrode body also being configured to collect the solid fuel thereon from the electrolyte flowing therethrough so as to comprise a first electrode for oxidizing the fuel to generate electrons for conduction by the first electrode;
   a second electrode for receiving electrons and reducing an oxidizer;
   the first electrode and the second electrode being spaced apart to define a gap therebetween for receiving the flow from the permeable electrode body;
   a plurality of return channels directly communicated to the gap and disposed radially outward from the permeable electrode body; and
   a flow generator configured to generate the flow comprising at least the electrolyte (i) through the permeable electrode body and towards the second electrode across the gap to transport at least the electrolyte and the oxidized fuel ions away from the permeable electrode body and towards the second electrode, and (ii) then through the plurality of return channels to transport at least the electrolyte and any by-product formed in the gap by the reaction of the oxidized fuel ions and the reduced oxidizer ions away from the gap without flowing through the second electrode.

2. An electrochemical cell according to claim 1, further comprising a supply containing the electrolyte and the solid fuel separately or together.

3. An electrochemical cell according to claim 2, wherein the solid fuel is selected from the group consisting of iron, zinc, magnesium, aluminum, and lithium.

4. An electrochemical cell according to claim 3, wherein the solid fuel is zinc.

5. An electrochemical cell according to claim 2, wherein the electrolyte comprises at least one aqueous solution selected from the group consisting of sulfuric acid, phosphoric acid, triflic acid, nitric acid, potassium hydroxide, sodium hydroxide, sodium chloride, potassium nitrate, and lithium chloride.

6. An electrochemical cell according to claim 5, wherein the electrolyte comprises potassium hydroxide.

7. An electrochemical cell according to claim 1 for use with oxidizable solid fuel particulates, wherein the permeable electrode body is a filter body configured to filter the fuel particulates from the electrolyte for collecting the fuel thereon.

8. An electrochemical cell according to claim 7, wherein the filter body comprises a carbon filter, a brass screen, or a bronze screen.

9. An electrochemical cell according to claim 1, wherein second electrode is a gas permeable electrode, having an outer surface exposed to ambient air such that the oxidizer comprises oxygen that permeates the second electrode.

10. An electrochemical cell according to claim 9, wherein the second electrode comprises a barrier membrane on the outer surface thereof that is gas permeable and liquid impermeable so as to permit permeation of the oxidizer via the outer surface of the second electrode and prevent the electrolyte from flowing through the outer surface of the second electrode.

11. An electrochemical cell according to claim 1, wherein a catalytic material of the second electrode comprises a material selected from the group consisting of manganese oxide, nickel, pyrolized cobalt, activated carbon, and platinum.

12. An electrochemical cell according to claim 1, wherein the plurality of return channels are disposed adjacent the permeable electrode body and opposite the gap from the second electrode.

13. An electrochemical cell according to claim 12, wherein the plurality of return channels are arranged peripherally around the permeable electrode body.

14. An electrochemical cell according to claim 13, wherein the permeable electrode body is supported by an electrode holder, and the electrode holder also has the plurality of return channels provided therethrough.

15. An electrochemical cell according to claim 14, wherein the electrode holder includes a cavity in which the permeable electrode body is received, and wherein the cavity and the return channels are parallel to one another.

16. An electrochemical cell system comprising:
   an electrolyte;
   oxidizable solid fuel; and
   a plurality of electrochemical cells arranged in an array;
   each electrochemical cell comprising:
   (i) a permeable electrode body provided along a flow path for receiving a flow comprising at least the electrolyte, the permeable electrode body being configured to permit the electrolyte to flow therethrough, the permeable electrode body also being configured to collect the solid fuel thereon from the electrolyte flowing therethrough so as to comprise a first electrode for oxidizing the fuel to generate electrons for conduction by the first electrode;
   (ii) a second electrode for receiving electrons and reducing an oxidizer;
   (iii) the first electrode and the second electrode being spaced apart to define a gap therebetween for receiving the flow from the permeable electrode body; and
   (iv) a plurality of return channels communicated directly to the gap and disposed radially outward from the permeable electrode body; and
   one or more flow generators configured to generate the flow in each electrochemical cell comprising at least the electrolyte (i) through the permeable electrode body and towards the second electrode across the gap to transport at least the electrolyte and the oxidized fuel ions away from the permeable electrode body and towards the second electrode, and (ii) then through the plurality of return channels to transport at least the electrolyte and any by-product formed in the gap by the reaction of the oxidized fuel ions and the reduced oxidizer ions away from the gap without flowing through the second electrode.

17. An electrochemical cell system according to claim 16, wherein the solid fuel is selected from the group consisting of iron, zinc, magnesium, aluminum, and lithium.

18. An electrochemical cell system according to claim 17, wherein the solid fuel is zinc.

19. An electrochemical cell according to claim 16, wherein the electrolyte comprises at least one aqueous solution selected from the group consisting of sulfuric acid, phosphoric acid, triflic acid, nitric acid, potassium hydroxide, sodium hydroxide, sodium chloride, potassium nitrate, and lithium chloride.

20. An electrochemical cell system according to claim 19, wherein the electrolyte comprises potassium hydroxide.

21. An electrochemical cell system according to claim 16, wherein the oxidizable solid fuel comprises solid fuel particulates, and wherein the permeable electrode body of each electrochemical cell is a filter body configured to filter the solid fuel particulates from the electrolyte for collecting the fuel thereon.

22. An electrochemical cell system according to claim 21, wherein the filter body comprises a carbon filter, a brass screen, or a bronze screen.

23. An electrochemical cell system according to claim 16, wherein the second electrode of each electrochemical cell is a gas permeable electrode having an outer surface exposed to ambient air such that the oxidizer comprises oxygen that permeates the second electrode.

24. An electrochemical cell system according to claim 16, wherein a catalytic material of each second electrode comprises a material selected from the group consisting of manganese oxide, nickel, pyrolized cobalt, activated carbon, and platinum.

25. An electrochemical cell system according to claim 24, wherein each second electrode comprises a barrier membrane on the outer surface thereof that is gas permeable and liquid impermeable so as to permit permeation of the oxidizer via the outer surface of the second electrode and prevent the electrolyte from flowing through the outer surface of the second electrode.

26. An electrochemical cell system according to claim 16, wherein in each electrochemical cell, the plurality of return channels are disposed adjacent the permeable electrode body and opposite the gap from the second electrode.

27. An electrochemical cell system according to claim 26, wherein in each electrochemical cell, the plurality of return channels are arranged peripherally around the permeable electrode body.

28. An electrochemical cell system according to claim 27, wherein in each electrochemical cell, the permeable electrode body is supported by an electrode holder, and the electrode holder also has the plurality of return channels provided therethrough.

29. An electrochemical cell system according to claim 28, wherein each electrode holder includes a cavity in which the permeable electrode body is received, and wherein the cavity and the return channels are parallel to one another.

30. An electrochemical cell system according to claim 16, wherein the second electrodes of the electrochemical cells are provided by a common second electrode.

31. An electrochemical cell system according to claim 16, further comprising walls separating the gaps of adjacent electrochemical cells from one another.

32. An electrochemical cell system according to claim 16, wherein the one or more flow generators is a single flow generator coupled to each of the electrochemical cells.

33. A method for generating electrical current using an electrochemical cell, the method comprising:
   flowing an electrolyte comprising an oxidizable solid fuel or ions thereof through a permeable electrode body provided along a flow path, the permeable electrode body permitting the electrolyte to flow therethrough and collecting the solid fuel thereon from the electrolyte so as to comprise a first electrode, the first electrode being spaced apart from a second electrode to define a gap therebetween;
   oxidizing the oxidizable solid fuel at the first electrode and reducing an oxidizer at the second electrode whereby electrons are generated for conduction from the first electrode to the second electrode via a load, and the oxidized fuel ions and reduced oxidizer ions react to form a by-product; and flowing the electrolyte (i) through the permeable electrode body and towards the second electrode across the gap to transport at least the electrolyte and the oxidized fuel ions away from the permeable electrode body and towards the second electrode, and (ii) then through a plurality of return channels disposed radially outward from the permeable electrode body to transport at least the electrolyte and the by-product formed in the gap by the reaction of the oxidized fuel ions and the reduced oxidizer ions away from the gap without flowing through the second electrode.

34. A method according to claim 33, wherein the solid fuel is selected from the group consisting of iron, zinc, magnesium, aluminum, and lithium.

35. A method according to claim 34, wherein the solid fuel is zinc.

36. A method according to claim 35, wherein the electrolyte comprises at least one aqueous solution selected from the group consisting of sulfuric acid, phosphoric acid, triflic acid, nitric acid, potassium hydroxide, sodium hydroxide, sodium chloride, potassium nitrate, and lithium chloride.

37. A method according to claim 36, wherein the electrolyte comprises potassium hydroxide.

38. A method according to claim 33, wherein the second electrode is a gas permeable electrode having an outer surface exposed to ambient air such that the oxidizer comprises oxygen that permeates the second electrode.

39. A method according to claim 38, wherein the second electrode comprises a barrier membrane on the outer surface thereof that is gas permeable and liquid impermeable so as to permit permeation of the oxidizer via the outer surface of the second electrode and prevent the electrolyte from flowing through the outer surface of the second electrode.

40. A method according to claim 33, wherein the plurality of return channels are disposed adjacent the permeable electrode body and opposite the gap from the second electrode such that the flow flowing towards and into the plurality of return channels is flowing away from the second electrode.

41. A method according to claim 40, wherein the plurality of return channels are arranged peripherally around the permeable electrode body such that the portion of the flow leaving the permeable electrode body and portion of the flow towards the plurality of return channels run counter to one another in an overlapping manner.

42. A method according to claim 33, wherein the collecting comprises filtering solid fuel particulates out of the electrolyte with the permeable electrode body.

43. A method according to claim 42, wherein said flowing the electrolyte and the oxidizable solid fuel through the permeable electrode body to perform said collecting of solid fuel by filtering and flowing the electrolyte through the permeable electrode body and across the gap to perform said transporting of oxidized fuel ions are performed simultaneously by the same flowing of electrolyte.

44. A method according to claim 33, wherein the collecting comprises electrodepositing the solid fuel onto the permeable electrode body.

45. A method according to claim 44, wherein said flowing the electrolyte and the oxidizable solid fuel through the permeable electrode body to perform said collecting of solid fuel by electrodepositing and flowing the electrolyte through the permeable electrode body and across the gap to perform said transporting of oxidized fuel ions are performed at different times, wherein said permeable electrode body functions as a cathode during the electrodepositing to reduce the solid fuel for collection thereon.

46. An electrochemical cell for use with an electrolyte and reactants comprising a fuel and an oxidizer, the electrochemical cell comprising:

electrodes comprising: (i) an anode for oxidizing the fuel into at least oxidized fuel ions and electrons, and (ii) a cathode for accepting electrons and reducing the oxidizer into at least reduced oxidizer ions;

a first of the electrodes being provided along a flow path for receiving a flow comprising the electrolyte and a corresponding first of the reactants, a second electrode for receiving a corresponding second of the reactants, the first and second electrodes being spaced apart to define a gap therebetween for receiving the flow from the first electrode;

a plurality of return channels communicated directly to the gap and disposed adjacent to and radially outward from the first electrode and opposite the gap from the second electrode; and a flow generator configured to generate a flow comprising at least the electrolyte (i) from the first electrode and towards the second electrode across the gap to transport at least the electrolyte and the ions formed from oxidation or reduction of the first reactant at the first electrode away from the first electrode and towards the second electrode, and (ii) then through the plurality of return channels to transport at least the electrolyte and any by-product formed by the reaction of the oxidized fuel ions and the reduced oxidizer ions away from the gap.

47. An electrochemical cell according to claim 46, wherein the plurality of return channels are arranged such that the portion of the flow leaving the first electrode and the portion of the flow towards the plurality of return channels run counter to one another in an overlapping manner.

48. An electrochemical cell according to claim 47, wherein the plurality of return channels are arranged peripherally around the first electrode.

49. An electrochemical cell according to claim 48, wherein the first electrode is supported by a holder, and the holder also has the plurality of return channels provided therethrough.

50. An electrochemical cell according to claim 49, wherein the holder includes a cavity in which the first electrode is received, and wherein the cavity and the return channels are parallel to one another.

51. An electrochemical cell according to claim 50, wherein the return channels are arranged with the first electrode being aligned with a center of a geometry defined by the return channels.

52. An electrochemical cell according to claim 46, wherein the first electrode is the anode, and the first reactant is the fuel, and wherein the second electrode is the cathode and the second reactant is the oxidizer.

* * * * *